(12) United States Patent
Dolgin et al.

(10) Patent No.: US 10,378,880 B2
(45) Date of Patent: Aug. 13, 2019

(54) SYSTEMS AND METHODS FOR PRECISE MEASUREMENT OF TRANSPARENT OBJECTS

(71) Applicant: RAYTHEON COMPANY, Waltham, MA (US)

(72) Inventors: Benjamin P. Dolgin, Alexandria, VA (US); Andrew Kowalevicz, Arlington, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/963,759

(22) Filed: Apr. 26, 2018

(65) Prior Publication Data

US 2018/0313642 A1    Nov. 1, 2018

Related U.S. Application Data

(60) Provisional application No. 62/490,360, filed on Apr. 26, 2017.

(51) Int. Cl.
*G01B 11/06* (2006.01)

(52) U.S. Cl.
CPC .................................. *G01B 11/06* (2013.01)

(58) Field of Classification Search
CPC ..................................................... G01B 11/06
USPC .................................. 356/614–640, 432–448
See application file for complete search history.

(56) References Cited

U.S. PATENT DOCUMENTS

| | | | | |
|---|---|---|---|---|
| 3,322,024 A | * | 5/1967 | Preston | G01N 21/896 250/559.03 |
| 4,610,542 A | * | 9/1986 | Ringlien | G01N 21/90 209/526 |
| 6,172,752 B1 | * | 1/2001 | Haruna | G01B 11/06 356/485 |
| 7,321,425 B2 | * | 1/2008 | Haran | G01J 3/1256 250/339.01 |

* cited by examiner

*Primary Examiner* — Tri T Ton
(74) *Attorney, Agent, or Firm* — Lando & Anastasi, LLP

(57) ABSTRACT

Methods and apparatus for measuring thickness and related properties of transparent objects, such as glass. In one example a measurement system includes a light source that produces a collimated optical beam, a modulator that modulates the collimated optical beam to produce a collimated modulated optical beam, optics configured to direct the collimated modulated optical beam to illuminate the transparent test object, and a detector sub-system that receives an intensity-modulated optical beam output from the test object and measures variations in intensity of the intensity-modulated optical beam corresponding to an intensity modulation of the intensity-modulated optical beam, the intensity-modulated optical beam being derived from interaction of the collimated modulated input optical beam with the transparent test object, the detector sub-system being further configured to produce a representation of the thickness and/or related properties of the test object based on the measured variations in intensity of the intensity-modulated optical beam.

16 Claims, 2 Drawing Sheets

SYSTEMS AND METHODS FOR PRECISE MEASUREMENT OF TRANSPARENT OBJECTS

CROSS-REFERENCE TO RELATED APPLICATIONS

This application claims the benefit under 35 U.S.C. § 119(e) of co-pending U.S. Provisional Application No. 62/490,360 filed on Apr. 26, 2017 and titled "METHODS FOR PRECISE MEASUREMENT OF TRANSPARENT TEST OBJECTS," which is incorporated by reference herein in its entirety for all purposes.

BACKGROUND

In general, measurements of the thickness of flat, transparent objects, such as glass stock, for example, are performed using an interferometer. This process is typically very slow, and typically requires metallization of the glass surfaces to create the reflective surfaces needed for interferometric measurements.

SUMMARY OF THE INVENTION

Aspects and embodiments are directed to methods and apparatus for measuring substantially flat, transparent objects, such as glass stock, for example, that may offer improvements or advantages over conventional approaches.

According to one embodiment a measurement system comprises a light source configured to produce a collimated optical beam, a modulator configured to modulate the collimated optical beam to produce a collimated modulated optical beam, optics configured to direct the collimated modulated optical beam to illuminate a transparent test object, a power detector configured to receive an intensity-modulated optical beam output from the test object and to measure variations in intensity of the intensity-modulated optical beam corresponding to an intensity modulation of the intensity-modulated optical beam, the intensity-modulated optical beam being derived from interaction of the collimated modulated optical beam with the transparent test object, and a processor coupled to the power detector and configured to produce a representation of variation of thickness of the test object based on the variations in intensity of the intensity-modulated optical beam measured by the power detector.

In one example the modulator is a phase modulator configured to phase-modulate the collimated optical beam and the resulting collimated modulated optical beam is a collimated phase-modulated optical beam. In another example the modulator is a frequency modulator configured to frequency-modulate the collimated optical beam and the resulting collimated modulated optical beam is a collimated frequency-modulated optical beam.

In one example the power detector includes at least one photodetector.

The measurement system may further comprise a first beam-blocking component including a first aperture positioned between the optics and the test object, the beam-blocking component being configured to allow a portion of the collimated modulated optical beam to travel through the first aperture to illuminate a test region of the test object and to block a remainder of the collimated modulated optical beam from reaching the test object. In one example the first aperture is dynamically repositionable within the first beam-blocking component. The measurement system may further comprise a second beam-blocking component including a second aperture and positioned on an opposite side of the test object relative to the first beam-blocking component, the second beam-blocking component being positioned between the test object and the power detector and arranged such that the second aperture is aligned with the first aperture and to allow the intensity-modulated optical beam to pass through the second aperture to reach the power detector. In another example the measurement system further comprises a reflector positioned on an opposite side of the test object relative to the first beam-blocking component and configured to reflect the collimated modulated optical beam back through the test object, the intensity-modulated optical beam output from the test object travelling through the first aperture, and a beam splitter positioned between the optics and the first beam-blocking component and configured to direct the collimated phase-modulated optical beam to the first beam-blocking component and to direct the intensity-modulated optical beam to the power detector. In one example the reflector is in contact with the test object.

In one example the light source includes a laser.

In another example the optics includes a beam expander.

In another example the processor is further configured to produce a representation of at least one of a surface roughness of the test object, a parallelism of surfaces of the test object, and a flatness of the test object based on the variations in the intensity of the intensity-modulated optical beam measured by the power detector.

According to another embodiment a method of characterizing properties of a transparent test object comprises producing a collimated phase-modulated optical beam, illuminating the test object with the collimated modulated optical beam, translating the test object through the collimated modulated optical beam in a direction perpendicular to a direction of propagation of the collimated modulated optical beam to produce an intensity-modulated optical beam derived from interaction of the collimated modulated optical beam with the test object, measuring variations in intensity of the intensity-modulated optical beam, the variations in intensity corresponding to an intensity modulation of the intensity-modulated optical beam, and providing a representation of a thickness of the test object based on the measured variations in the intensity of the intensity-modulated optical beam.

In one example producing the collimated modulated optical beam includes generating a collimated optical beam with a laser, and modulating the collimated optical beam with a phase modulator to produce a collimated phase-modulated optical beam.

In another example producing the collimated modulated optical beam includes generating a collimated optical beam with a laser, and modulating the collimated optical beam with a frequency modulator to produce a collimated frequency-modulated optical beam.

In one example illuminating the test object with the collimated modulated optical beam includes allowing a portion of the collimated modulated optical beam to pass through an aperture of a beam-blocking component to illuminate a test region of the test object and blocking a remainder of the collimated modulated optical beam from reaching the test object with the beam-blocking component. In another example translating the test object through the collimated modulated optical beam includes repositioning the aperture of the beam-blocking component to alter a location of the test region within the test object.

In one example providing the representation of the thickness of the test object includes providing a thickness profile for the test object.

In another example the method further comprising providing a representation of at least one of a surface roughness of the test object, a parallelism of surfaces of the test object, and a flatness of the test object based on the variations in the intensity of the intensity-modulated optical beam measured by the power detector.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Conventionally, precision measurement of uncoated glass stock with accuracies below several nanometers (nm) requires complex interferometers and typically is very slow and laborious. Performing these measurements on glass stock with poorly polished surfaces is extremely difficult.

Aspects and embodiments provide systems and methods for performing precision measurements on substantially flat, transparent objects, such as flat glass stock, that have several advantages over conventional approaches. For example, unlike conventional interferometer-based glass thickness measurement techniques, it is not necessary that the test object be coated or metallized for measurements using the approaches disclosed herein. In addition, it is not necessary that the object surfaces be highly polished, and the measurements may be performed more quickly than interferometer-based measurements.

As discussed in more detail below, according to certain embodiments, measurements of a test object (such as piece of flat glass stock or glass slide, for example) are performed by exposing the test object to a collimated, modulated optical beam that covers the test area. The optical beam can be phase-modulated or frequency-modulated. In certain examples, the collimated, modulated optical beam covers the whole test object. Interaction of the collimated, modulated input optical beam with the test object converts the frequency- or phase-modulated input optical beam into an intensity-modulated output optical beam, and translation of the test object through the collimated, modulated optical beam encodes the resulting intensity modulation with information about the test object, such as the thickness of the test object. The intensity-modulated output beam can be detected and decoded by an optical power detector, such as a photodiode, to extract the encoded information about the test object.

Figure 1:
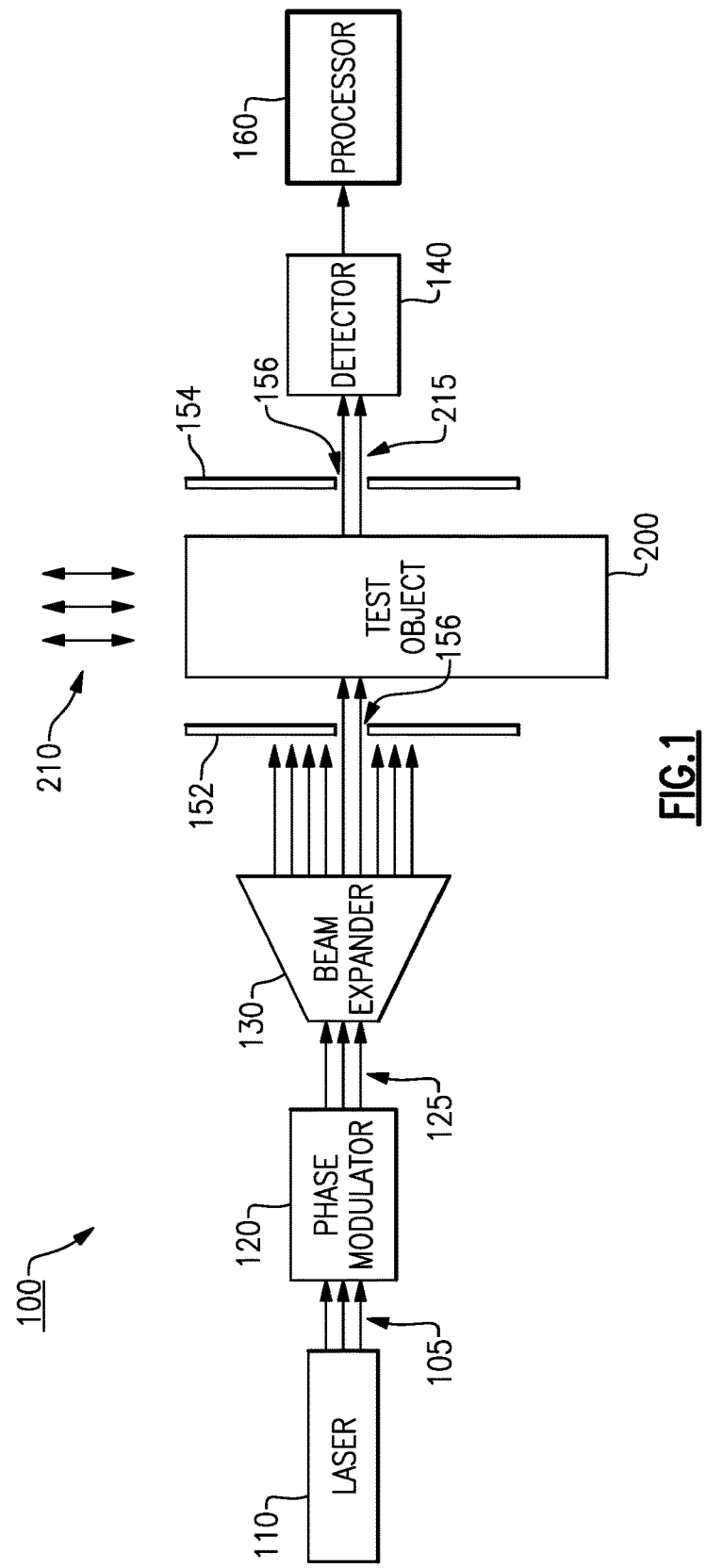
FIG. 1 is a block diagram of one example of a measurement system according to aspects of the invention.

Referring to FIG. 1, there is illustrated one example of a system according to certain embodiments. In this example, the system 100 includes a light source 110 that produces a collimated light beam 115. In one example, the light source 110 is a laser. The light source 110 may include any necessary optical elements to collimate the light beam 115. The light beam 115 may be in the visible or infrared regions of the electromagnetic spectrum, for example, and may have any wavelength within the optical regions of the electromagnetic spectrum. The system 100 includes a modulator 120 that phase-modulates or frequency-modulates the collimated light beam 115 to produce a collimated modulated optical beam 125. The system may further include a beam expander 130 configured to spatially broaden the collimated modulated beam optical 125, for example, to allow an entire test object 200 or a specified portion of the test object 200 to be illuminated by the beam 125. The light source 100, modulator 120 and beam expander 130 may be separate components or may be combined in one or more components. Accordingly, FIG. 1 is intended to illustrate the functional components of the system 100 and not necessarily any particular physical implementation of these components.

According to certain embodiments, the test object 200 is translated through the collimated modulated optical beam 125 (translation movement indicated by arrows 210 in FIG. 1) to characterize aspects of the test object, such as thickness or surface roughness, for example. The translation movement is in a direction perpendicular (or orthogonal) to a direction of propagation of the collimated modulated beam 125, as shown by arrows 210. As the collimated phase-modulated or frequency-modulated beam 125 interacts with the test object 200, the beam is converted into an intensity-modulated (IM) output optical beam 215, as discussed further below. The IM beam modulation can be measured by a power detector 140. The intensity of the intensity modulation on the beam 215 is related to the local thickness of the test object 200. Thus, according to certain examples, the change in the resulting AC signal on the detector 140 is proportional to the change in the local thickness of the test object 200 in units of half the wavelength of the intensity-modulated optical beam 215. In certain examples the detector 140 can include an array of power detector elements, with each power detector element aligned with a known spatial position of the test object 200 in the system 100 at the time of the measurement, such that the measurements from the array can be used to produce a "thickness profile" of the test object 200. In certain examples, this thickness profile may provide a characterization of the degree of "flatness" of the test object 200, or a characterization of the surface roughness of the test object 200. The thickness profile may also be obtained using a single detector element by scanning the field of view of the detector element across the test object 200 (e.g., by moving either or both of the detector 140 and the test object 200); however, faster measurements may be performed using an array of power detector elements.

As discussed above, when the input collimated phase-modulated or frequency-modulated optical beam 125 interacts with the test object 200, it is converted into the intensity-modulated output optical beam 215 which encodes information related to the thickness of the test object 200. The test object 200 may act as an optical resonator that accumulates resonant optical energy (from the received collimated phase- or frequency-modulated beam 125) and which is capable of sensing transitions, such as phase transitions representative of the phase modulation of the arriving optical beam 125, for example, and transforming those transitions into intensity modulation of an output optical signal (e.g., the intensity-modulated optical beam 215) through interaction of the arriving optical beam 125 with optical signal energy built-up or held in the optical resonator. Due to the difference in index of refraction of the material(s) making up the test object 200 (e.g., glass) and the surrounding medium (e.g., air), the surfaces of the test object 200 are semi-reflective to the incident collimated modulated optical beam 125, even though they need not be coated, polished, or otherwise made to be highly reflective, and accordingly, optical energy can be accumulated within the test object 200 through a series of reflections of the incident collimated modulated optical beam 125 inside the test object. In this regard, the test object 200 may act similar to a Fabry-Perot resonator. When a steady-state condition is established within the test object 200, optical signal energy is output from test object 200 at a steady or constant intensity. When a variation occurs in the arriving optical signal, such as a phase transition or frequency transition in the collimated, phase-modulated or frequency-modulated optical beam 125, the steady-state condition is temporarily disrupted, and the intensity of the output optical signal energy is temporarily disrupted as well until a steady state condition is re-established. Accordingly, the phase modulation or frequency modulation of the arriving collimated modulated optical beam 125 is converted into intensity modulation of the output intensity-modulated optical beam 215. This intensity modulation can be measured by a power detector, such as a photodetector, in the detector 140.

The intensity modulation of the output intensity-modulated beam 215 is dependent on the phase or frequency modulation of the collimated modulated optical beam 125 and the thickness of the test object 200, and may also have a very weak dependence on the reflective coefficient of the surface of the test object 200. In a conventional Fabry-Perot resonator, for example, in which the surfaces of the resonant structure (or etalon) are highly reflective (e.g., having a reflective coefficient above approximately 0.95), the intensity modulation of the output optical beam from the resonator can be dependent on the reflectivity or reflective coefficient of the surfaces of the resonator. However, as discussed above, an advantage of the technique according to embodiments disclosed herein is that it is not necessary for the surfaces of the test object 200 to be highly reflective. Rather, in certain embodiments (e.g., where the test object 200 is uncoated or unpolished or roughly polished glass), the reflective coefficient of the surfaces of the test object 200 may be less than 0.95, or in a range of only 0.1-0.75, or 0.1-0.80, or 0.1-0.90. In such examples, the intensity modulation of the output intensity-modulated optical beam 215 is essentially not affected by changes in the reflective coefficient of the surfaces of the test object 200 (the dependence is so weak as to be negligible and can be ignored for measurement purposes), and is determined by the phase or frequency modulation on the collimated modulated optical beam 125 and the thickness of the test object. Thus, if the phase modulation or frequency modulation of the input collimated modulated optical beam 125 is known, the measured intensity modulation of the output intensity-modulated optical beam 215 provides information about the thickness of the test object 200. Further, by translating the test object 200 through the collimated modulated optical beam 125, a profile of the spatial variations in the thickness of the test object 200 can be obtained, which may provide information about characteristics of the test object such as surface roughness, parallelism, and/or flatness can be obtained.

As discussed above, in certain examples the entire test object 200 can be illuminated with the collimated phase-modulated or frequency-modulated optical beam 125 for each measurement. In other examples, a portion of the test object 200 can be isolated for measurements. Still referring to FIG. 1, in certain embodiments, this isolation can be accomplished by using a beam-blocking component, such as an opaque plate, for example, containing an aperture that allows a small portion of the input collimated modulated beam 125 to illuminate a test region of the test object 200 while the beam-blocking component blocks the remainder of the input beam 125. In the example shown in FIG. 1, the system 100 includes a pair of beam-blocking plates 152, 154, each plate including an aperture 156, positioned on either side of the test object 200. The beam-blocking plates 152, 154 can be aligned with one another such that the apertures 156 in each plate line up to allow the portion of the collimated phase-modulated or frequency-modulated beam 125 to pass through the apertures 156 and through the test region of the test object 200 to reach the detector 140, as shown in FIG. 1. In certain examples the apertures 156 can be physical holes in the beam-blocking plates 152, 154. In other examples the apertures 156 can be optically transparent regions of the beam-blocking plates 152, 154 that allow light of the wavelength (or wavelength range) of the collimated phase-modulated or frequency-modulated beam 125 to pass through.

Translation of the test object 200 through the collimated phase-modulated or frequency-modulated beam 125 can be accomplished by moving the test object itself, or by moving the apertures 156. Moving the apertures 156 can be accomplished by physically moving the beam-blocking plates 152, 154 or by altering the optical transmission properties of the beam-blocking plates 152, 154 to relocate the apertures 156. In some examples the size of the apertures 156 can be adjustable. By translating the test region of the test object 200 through the portion of the collimated phase-modulated or frequency-modulated beam 125 (by moving the test object 200 or the apertures 156) and measuring the changes in intensity-modulated beam 215, the distribution of the object thickness can be obtained. In some examples, multiple apertures 156, each aligned with an individual detector 140 (or individual detector element within the detector 140), can be used to permit multiple simultaneous measurements of the test object 200.

In the example shown in FIG. 1, the system 100 includes the pair of beam-blocking plates 152, 154 with apertures 156 positioned on either side of the test object 200. However, in other example, the system may include only a single beam-blocking component with an aperture 156 that can be placed on either side of the test object 200. Further, as will be appreciated by those skilled in the art, given the benefit of this disclosure, in other examples isolation of the test region of the test object 200 can be achieved using a mechanism other than a beam-blocking component with an aperture.

The system 100 may include a processor 160 coupled to the detector 140 and configured to receive the power/ intensity measurements from the detector 140 and to produce a characterization of the test object 200 based on the measurements from the detector. For example, the processor 160 may produce a characterization of the surface profile (e.g., for roughness measurements) of the test object 200, or of the thickness or thickness profile of the test object 200, based on the intensity measurements taken by the detector 140. The processor 160 may include standard computing components to convert the signals received from the detector 140 into representations of the thickness or related characteristics of the test object 200, as will be understood by those skilled in the art, given the benefit of this disclosure. Although illustrated as a separate component from the detector 140 in FIG. 1, in certain embodiments, the processor 160 and detector 140 may be combined in a single component.

Figure 2:
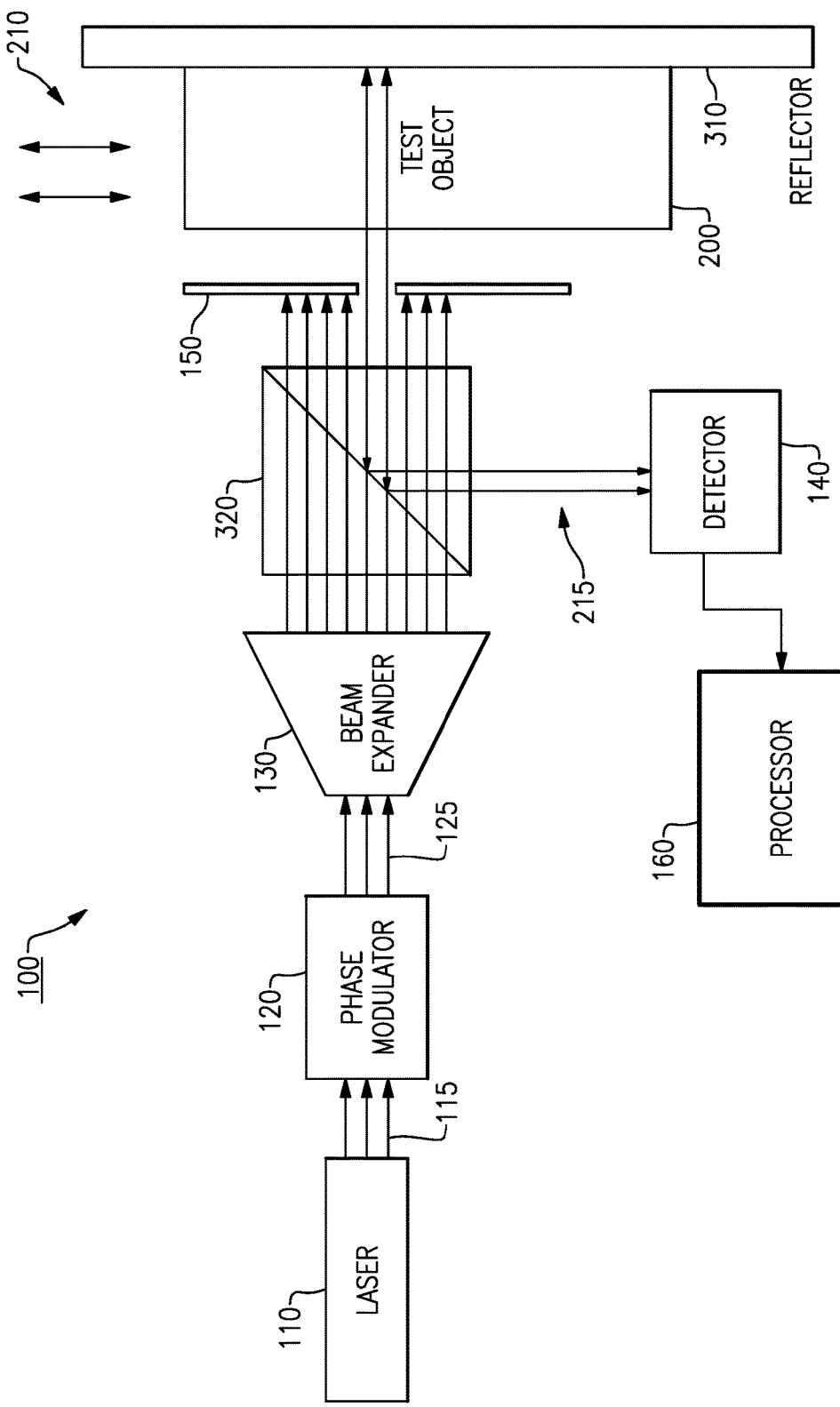
FIG. 2 is a block diagram of another example of the measurement system according to aspects of the present invention.

In certain embodiments the detector 140 can be located on the same side of the test object 200 as the light source 110 rather than on the opposite side as shown in FIG. 1. For example, FIG. 2 illustrates an arrangement of the system 100 in which a reflector 310 is positioned adjacent the test object 200 and configured to reflect the modulated beam 125 back through the test object 200. A beam splitter 320 can be used to direct the incoming beam from the light source 110 (the collimated phase-modulated or frequency-modulated beam 125) to the test object 200 and to direct the intensity-modulated beam 215 output from the test object 200 to the detector 140, as shown in FIG. 2. This "reflection mode" of operation may be used for measurements performed during polishing of a glass test object, for example. Although it is not necessary for the test object 200 to be polished in order for the measurements to be performed, in many applications, highly polished glass objects are needed. Embodiments of the measurement techniques disclosed herein can advantageously be performed during such polishing processes. This may advantageously save time by combining the polishing and thickness measurements, and/or offer improvements in the polishing process by providing real-time (or close to real-time) feedback regarding the surface profile of the test object and therefore the condition of the polished surface(s).

As shown in FIG. 2, in certain such examples, the system 100 includes a single beam-blocking plate 150 with an aperture 156 to isolate a test region of the test object 200, as discussed above. In the illustrated example, the test object 200 is shown positioned contacting the reflector 310; however, in other examples the test object 200 can be spaced apart from the reflector 310.

Thus, aspects and embodiments provide systems and methods to accomplish precise measurements of the thickness or surface profile of transparent objects that may be faster and have fewer requirements on the test object than conventional approaches. For example, unlike conventional interferometer-based glass thickness measurement techniques, it is not necessary that the test object be coated or metallized for measurements using the approaches disclosed herein. Further, the test object can be roughly polished (for example on the order of rms ~1 μm as opposed to λ/20). Aspects and embodiments provide for direct thickness-distribution measurement of an uncoated transparent test object, such as glass, for example. Further aspects and embodiments provide for direct measurement of variation in the optical thickness of the test object. As discussed above, the systems and methods disclosed herein may provide for high speed thickness measurements, and may provide measurements of other related characteristics, such as parallelism, flatness, straightness, and surface roughness of a transparent test object. The measurements can be performed during polishing.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments disclosed herein may be combined with other embodiments in any manner consistent with at least one of the principles disclosed herein, and references to "an embodiment," "some embodiments," "an alternate embodiment," "certain embodiments," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Further examples and embodiments disclosed herein are not limited in application to the details of construction and the arrangement of components set forth in the foregoing description or illustrated in the accompanying drawings. Various examples are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only.

What is claimed is:

1. A measurement system comprising:
 a light source configured to produce a collimated optical beam;
 a modulator configured to modulate the collimated optical beam to produce a collimated modulated optical beam;
 optics configured to direct the collimated modulated optical beam to illuminate a transparent test object;
 a first beam-blocking component including a first aperture positioned between the optics and the test object, the beam-blocking component being configured to allow a portion of the collimated modulated optical beam to travel through the first aperture to illuminate a test region of the test object and to block a remainder of the collimated modulated optical beam from reaching the test object;
 a power detector configured to receive an intensity-modulated optical beam output from the test object and to measure variations in intensity of the intensity-modulated optical beam corresponding to an intensity modulation of the intensity-modulated optical beam, the intensity-modulated optical beam being derived from interaction of the collimated modulated optical beam with the transparent test object; and
 a processor coupled to the power detector and configured to produce a representation of variation of thickness of the test object based on the variations in intensity of the intensity-modulated optical beam measured by the power detector.

2. The measurement system of claim 1 wherein the modulator is a phase modulator configured to phase-modulate the collimated optical beam and the resulting collimated modulated optical beam is a collimated phase-modulated optical beam.

3. The measurement system of claim 1 wherein the modulator is a frequency modulator configured to frequency-modulate the collimated optical beam and the resulting collimated modulated optical beam is a collimated frequency-modulated optical beam.

4. The measurement system of claim 1 wherein the power detector includes at least one photodetector.

5. The measurement system of claim 1 wherein the first aperture is dynamically repositionable within the first beam-blocking component.

6. The measurement system of claim 1 further comprising:
a second beam-blocking component including a second aperture and positioned on an opposite side of the test object relative to the first beam-blocking component, the second beam-blocking component being positioned between the test object and the power detector and arranged such that the second aperture is aligned with the first aperture and to allow the intensity-modulated optical beam to pass through the second aperture to reach the power detector.

7. The measurement system of claim 1 further comprising:
a reflector positioned on an opposite side of the test object relative to the first beam-blocking component and configured to reflect the collimated modulated optical beam back through the test object, the intensity-modulated optical beam output from the test object travelling through the first aperture; and
a beam splitter positioned between the optics and the first beam-blocking component and configured to direct the collimated phase-modulated optical beam to the first beam-blocking component and to direct the intensity-modulated optical beam to the power detector.

8. The measurement system of claim 7 wherein the reflector is in contact with the test object.

9. The measurement system of claim 1 wherein the light source includes a laser.

10. The measurement system of claim 1 wherein the optics includes a beam expander.

11. The measurement system of claim 1 wherein the processor is further configured to produce a representation of at least one of a surface roughness of the test object, a parallelism of surfaces of the test object, and a flatness of the test object based on the variations in the intensity of the intensity-modulated optical beam measured by the power detector.

12. A method of characterizing properties of a transparent test object, the method comprising:
producing a collimated modulated optical beam;
illuminating the test object with the collimated modulated optical beam, including allowing a portion of the collimated modulated optical beam to pass through an aperture of a beam-blocking component to illuminate a test region of the test object and blocking a remainder of the collimated modulated optical beam from reaching the test object with the beam-blocking component;
translating the test object through the collimated modulated optical beam in a direction perpendicular to a direction of propagation of the collimated modulated optical beam to produce an intensity-modulated optical beam derived from interaction of the collimated modulated optical beam with the test object, wherein translating the test object includes repositioning the aperture of the beam-blocking component to alter a location of the test region within the test object;
measuring variations in intensity of the intensity-modulated optical beam, the variations in intensity corresponding to an intensity modulation of the intensity-modulated optical beam; and
providing a representation of a thickness of the test object based on the measured variations in the intensity of the intensity-modulated optical beam.

13. The method of claim 12 wherein producing the collimated modulated optical beam includes:
generating a collimated optical beam with a laser; and
modulating the collimated optical beam with a phase modulator to produce a collimated phase-modulated optical beam.

14. The method of claim 12 wherein producing the collimated modulated optical beam includes:
generating a collimated optical beam with a laser; and
modulating the collimated optical beam with a frequency modulator to produce a collimated frequency-modulated optical beam.

15. The method of claim 12 wherein providing the representation of the thickness of the test object includes providing a thickness profile for the test object.

16. The method of claim 12 further comprising providing a representation of at least one of a surface roughness of the test object, a parallelism of surfaces of the test object, and a flatness of the test object based on the variations in the intensity of the intensity-modulated optical beam measured by the power detector.

* * * * *